United States Patent Office 2,894,985
Patented July 14, 1959

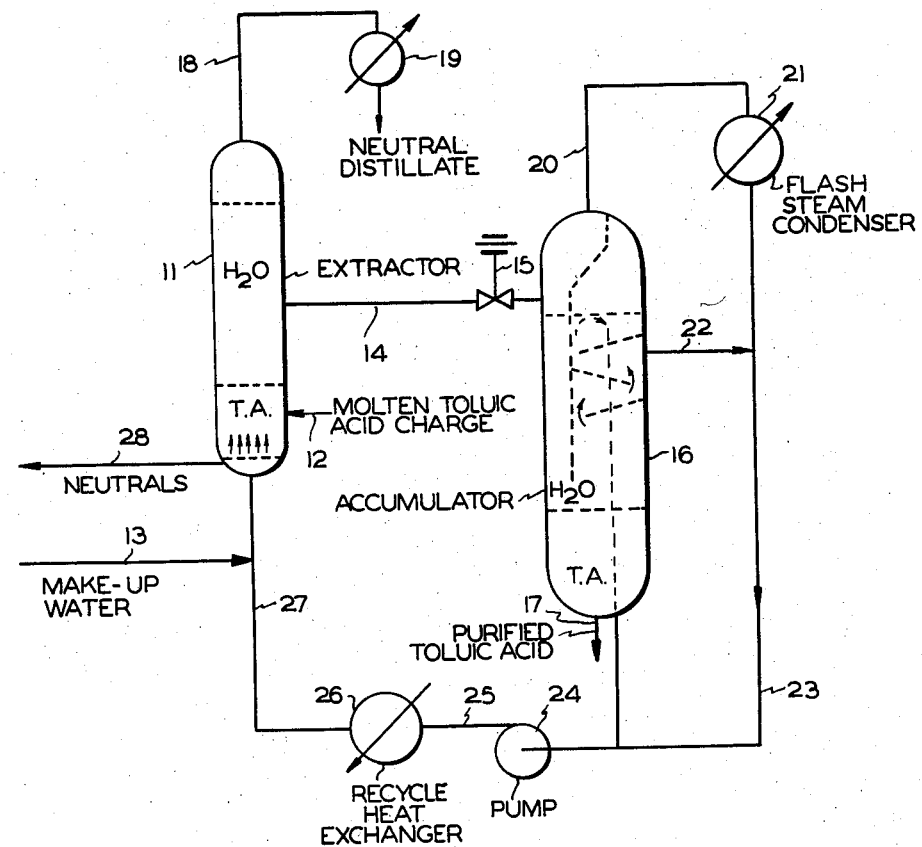

2,894,985

PURIFICATION OF TOLUIC ACID

Richard L. Grantham, Downey, and Chien Liu, Anaheim, Calif., assignors to Richfield Oil Corporation, Los Angeles, Calif., a corporation of Delaware Application November 21, 1955, Serial No. 547,945

1 Claim. (Cl. 260—525)

This invention relates to an improved process for the purification of crude toluic acids. Toluic acids produced by the oxidation of xylenes with an oxygen-containing gas, in the presence of cobalt, cerium and manganese catalysts, for example, are normally contaminated with nonacidic oxygenated compounds termed "neutrals." Many of the contaminating compounds are derived from impurities in the feed stock while others constitute the products of secondary reactions. The so-called "neutrals" consist largely of tars and oxygenated materials such as acetophenone, tolualdehyde, esters and the like. The presence of contaminating materials in toluic acids is highly undesirable since they generally cause the product to be unstable with respect to color and, when present in significant quantities, constitute an undesirable diluent. Therefore, since relatively pure toluic acids are desirable for certain purposes, various methods of purifying these acids have been studied.

The removal of the contaminating materials normally found in crude toluic acids presents a difficult problem since many of the methods commonly employed in the purification of organic acids are more or less unsatisfactory. For example, simple distillation of crude toluic acids is not commercially practicable since it is incapable of removing the bulk of the neutrals without suffering a substantial loss of toluic acids in the bottoms product. This is true even though the majority of the neutrals boil at temperatures above or below the boiling range of the desired toluic acid fraction since significant amounts of the neutrals boil within this range. Solvent extraction of crude toluic acids with hydrocarbon solvents is also undesirable, although this method removes substantially all of the neutrals, since it fails to remove certain other contaminants sufficiently completely to produce a toluic acid product of satisfactory color stability. This method is also unsatisfactory in that toluic acids are partially soluble in hydrocarbon solvents with the result that significant amounts of the valuable acids remain in the solvents after treatment and can be recovered only with difficulty. Chemical methods for the purification of toluic acids are generally expensive and unsatisfactory. For example, when crude toluic acids are dissolved in caustic soda and then acidified with a mineral acid the bulk of the neutrals are removed but the contaminating materials which degrade the color stability of the treated toluic acids remain. A need exists in the art, therefore, for a method of treating crude toluic acids which affords substantially complete recovery of pure acids having satisfactory color stability on storage. The process of the present invention supplies this need since it effects a satisfactory and economical separation of the acids from the neutrals and other contaminants and can afford a toluic acid product having a purity of 99% or higher in a yield in excess of 98% based on the amount of toluic acids in the crude toluic acids.

The process of the present invention is predicated on the discovery that crude toluic acids obtained by the oxidation of xylenes with an oxygen-containing gas can be purified by extraction with water at elevated temperatures and pressures with subsequent cooling of the aqueous extract to separate the purified product. The term "xylenes" as used in the specification and claims is intended to include pure xylene isomers, mixtures of xylene isomers, or other xylene-containing materials such as petroleum fractions containing mixed xylenes together with paraffins, naphthenes, ethylbenzene and the like. The process of the present invention is employed with particular advantage in the purification of mixed crude toluic acids obtained by the oxidation with an oxygen-containing gas of mixed isomeric xylenes or petroleum fractions containing mixed xylenes. Crude toluic acids of this type ordinarily contain appreciable amounts of neutrals. It has been discovered that neutrals and other contaminants normally present in crude toluic acids of the type described above are substantially insoluble in water even at elevated temperatures and pressures. In the process of the present invention operating conditions are selected which permit the extraction of pure toluic acids from crude toluic acids obtained by the oxidation of xylenes with an oxygen-containing gas without dissolving the neutrals which ordinarily accompanying these acids, thus effecting a clean separation of the pure acids from the contaminating neutrals. Toluic acids have a low solubility in water under normal conditions but are considerably more soluble at elevated temperatures and pressures. It is possible, therefore, to dissolve appreciable amounts of toluic acids in water at elevated temperatures when the pressure in the system is sufficiently high to maintain the water in the liquid phase. Cooling the resulting hot aqueous toluic acid-containing extract, for example by flashing at reduced pressures or by any other suitable means, precipitates pure molten toluic acids at temperatures below about 100° C.; crystalline toluic acid being formed at about 70° C.

The advantages of using water as a solvent for the purification of toluic acids are readily apparent. Water is both inexpensive and readily available and its ability to dissolve toluic acid can be easily regulated by varying the pressure and temperature in the system. Furthermore, water is an extremely selective solvent for pure toluic acids in crude, neutrals-containing toluic acids obtained by the oxidation of xylenes with an oxygen-containing gas.

An advantageous method of carrying out the extraction operation of the present invention comprises charging crude toluic acids to an extraction zone and introducing water, at a temperature of about 80 to 260° C., to the extraction zone at a point below the level of the crude toluic acids in the extractor. The water is fed to the extractor at a rate sufficient to maintain a condition of mild turbulence in the crude toluic acids. A pressure sufficient to maintain water in the liquid phase is employed to provide a stable interface between the aqueous phase and the toluic acids phase in the extraction zone. Neutrals which are separated from the toluic acids are removed from the bottom of the extraction zone. A clear aqueous toluic-acid-containing extract is removed from the supernatant aqueous phase in the extraction zone and cooled to precipitate substantially pure toluic acids which are easily separated from the resulting lean aqueous extract.

The solubility of mixed toluic acids in water at various temperatures is shown in Table I below. Less than 1% of toluic acids is soluble in water at temperatures below about 75° C. whereas as much as 15% of the acids is soluble at temperatures of 200° C. or higher. The solubility will vary somewhat with the isomer distribution.

TABLE I

*Solubility of mixed toluic acids in water*

| Temperature, °C.: | Solubility, percent by weight |
|---|---|
| 55 | 0.73 |
| 75 | 1.00 |
| 170 | 6.8 |
| 200 | 15 |

The process of the present invention will be further described with reference to the drawing which is a flow diagram illustrating the operation of the new purification process.

Molten crude toluic acid is introduced to the system through line 12 at the bottom of extractor 11 where it is contacted with water at elevated temperatures and pressures introduced to the extractor through lines 13 and 27. The clear, fat toluic acid-containing aqueous extract from the extractor is passed through line 14 to liquid level control valve 15 and then into accumulator 16 where it is flashed to atmospheric pressure dropping out toluic acid. The purified toluic acid is maintained in a molten condition in accumulator 16 and can be drawn off continuously or as desired through line 17. Lighter neutrals, which may distill with water in the extractor 11 pass overhead through line 18 and are condensed in condenser 19. The neutrals also may be skimmed off by mechanical means. Flash steam from accumulator 16 passes overhead through line 20 and is condensed in condenser 21. The condensate from condenser 21 is combined with supernatant water drawn off from accumulator 16, through line 22 and passed through line 23 to pump 24 then through line 25 to heat exchanger 26 and recycled to the bottom of the extractor 11 through line 27. The heated recycle stream is dispersed throughout the toluic acid melt in the bottom of extractor 11 to maintain a low level of turbulence. Neutrals which accumulate in the bottom of extractor 11 may be drawn off periodically through line 28. These heavy neutrals can be distilled to separate an impure toluic acid fraction which can be recycled to the extractor for the further recovery of acids.

The operating conditions employed in the process of the present invention include temperatures in the range from about 80 to 260° C., preferably 150 to 200° C., and pressures ranging from about atmospheric up to about 1000 p.s.i.g. or more, preferably from 50 to 250 p.s.i.g. The pressure employed in the process is dependent upon the temperature, the only requirement being that the pressure be sufficient to maintain the water in the extraction zone in the liquid phase. The ratio of water to crude toluic acids employed can vary from about 1 to 10 although it is preferred to employ about 2 to 10 volumes of water per volume of crude toluic acid. As an example of suitable operating conditions the process can be carried out with advantage at an extraction temperature of 170° C., a pressure of 150 p.s.i.g. and a temperature of 100° C. in the accumulator which is maintained at atmospheric pressure. Operation under these conditions permits the extraction of pure toluic acids to the extent of about 5% by weight of the water employed. Increased efficiency is achieved with a temperature of 200° C. in the extraction zone with a pressure sufficient to maintain the water in the liquid phase and flashing at atmospheric pressure and 100° C. in the accumulator. Operation under these conditions provides for the extraction of pure toluic acid to the extent of about 13% by weight of the water employed.

It is important to maintain the operating pressure of the extractor at a point sufficiently high to maintain the water in the extractor in the liquid state to provide a stable interface between the aqueous and crude toluic acid phases in the extractor. The maintenance of a stable interface is important in order to avoid contaminating the extract by mechanical carryover of crude toluic acid. Table II below shows the relative densities of mixed toluic acids and water at various temperatures. The density of molten toluic acid ranges from about 10 to 13% greater than that of water thus assuring a stable interface as long as the water is maintained in the liquid state.

TABLE II

*Density of toluic acids and water versus temperature*

| Temperature, °C. | Mixed Toluic Acids, Gm./Ml. | Water, Gm./Ml. |
|---|---|---|
| 80 | 1.074 | .972 |
| 152 | 1.021 | .915 |
| 199 | .977 | .864 |

The process of the present invention is employed with particular advantage in the purification of crude mixed toluic acids. One such crude toluic acid fraction contained approximately 3% ortho toluic acid, 30% para toluic acid and 65% of meta toluic acid, the remaining 2% being neutral impurities. The amount of neutral impurities can vary over a wide range and generally from about 0.2% to 20% of the fraction is comprised of neutrals which may consist of tolualdehyde, acetophenone, tars and various other oxygenated substances. The process of the present invention can be operated on either a batchwise or continuous basis. The following examples illustrate typical batch operations.

EXAMPLE I

A 250 gram sample of mixed crude toluic acids, obtained by the oxidation of mixed xylenes with an oxygen-containing gas, containing 80.4% of toluic acids, 3.6% benzoic acids and 16% neutrals was charged to a 1 liter beaker. The material was batch extracted with 550 ml. of distilled water maintained at near the boiling temperature. Portions of the extract were drawn off and cooled to obtain snow white crystals of toluic acids having a Gardner color of 1 in the molten state. The crude toluic acids employed in this example were dark in color.

EXAMPLE II

A batch extraction similar to that of Example I was conducted on a composited sample of crude toluic acids obtained by mixing samples of crude toluic acids having compositions approximating that described in Example I. The crude acids were prepared by the oxidation of various xylene-containing fractions with an oxygen-containing gas. The extracts were siphoned off, cooled to collect the product as pure crystals of toluic acid and the liquid pumped back into the extratcor. The crystalline material collected was snow white and had a neutralization equivalent of 135.5 compared to the theoretical value of 136.14, the small discrepancy in the neutralization equivalent being due to the presence of a small amount of benzoic acid. The improvement in the purity of the crude toluic acids treated in this example is apparent since the crude material had a neutralization equivalent of approximately 150. Successive extractions of the sample resulted in the darkening of the crude toluic acids remaining in the beaker. The process was discontinued after a number of extractions and the neutralization equivalent of the remaining bottoms was determined to be 354. Polarographic analysis of this bottoms product indicated the presence of a large amount of carbonyl group-containing constituents.

EXAMPLE III

A 152 gram sample of crude toluic acids obtained by the oxidation of mixed xylenes with an oxygen-containing gas and 225 ml. of distilled water were charged to a stainless steel autoclave having a 485 ml. capacity. The autoclave was pressured to 110 p.s.i.g. with nitrogen, heated to a temperature of 200° C. and then cooled to 190° C. The fat toluic acid-containing aqueous extract was drawn off through a side arm and flashed into another autoclave maintained at atmospheric pressure. Molten toluic acid having a purity of 99% was collected as in the two previous examples.

The quality of the product produced by the process of the present invention is illustrated by the data in Table III below which summarizes the results obtained by extracting crude toluic acids under various conditions of temperature at atmospheric pressure.

TABLE III

| Number | Toluic Acid | Benzoic Acid | Neutrals |
|---|---|---|---|
| 1 | 99.7 | 0.1 | 0.2 |
| 2 | 99.0 | 0.8 | 0.2 |
| 3 | 99.5 | 0.1 | 0.4 |

The superiority of the toluic acids obtained by the process of the present invention is illustrated in Table IV below which compares typical products of the present invention with those obtained by extraction with a hydrocarbon solvent.

TABLE IV

| Test Number | Method of Purification | Gardner Color [1] | Neutralization Equivalent |
|---|---|---|---|
| 1 | None | 15 | 160 |
| 2 | Solvent Extraction (Normal Hexane) | 7 | 139 |
| 3 | do | 8 | 137 |
| 4 | Present Invention | 1 | 135.5 |

[1] Molten acid.

It is to be understood that the examples and data given above are merely illustrative and are not to be construed as limiting the invention claimed below.

We claim:

A process for the purification of crude neutrals-containing toluic acid obtained by the oxidation of xylene with an oxygen-containing gas and consisting essentially of toluic acid and neutrals obtained in the oxidation which comprises charging said crude toluic acid to an extraction zone, introducing water at a temperature of about 80 to 260° C. to said extraction zone and into and through the crude toluic acid in said zone, said water being introduced at a rate sufficient to maintain said crude toluic acid in a state of mild turbulence, maintaining a pressure in said extraction zone sufficient to keep the water in said zone in the liquid phase and to provide a stable interface between the crude toluic acid and the aqueous toluic acid phases, removing a heavy neutrals concentrate from the lower portion of said extraction zone, and removing light neutrals from the upper portion of said extraction zone, removing aqueous toluic acid-containing extract from the supernatant aqueous phase in the extraction zone, cooling said toluic acid-containing aqueous extract to precipitate toluic acid, and separating substantially pure toluic acid from the resulting lean aqueous extract.

References Cited in the file of this patent

UNITED STATES PATENTS 2,572,575    Shafer et al.    Oct. 23, 1951
2,749,363    Williamson et al.    June 5, 1956

OTHER REFERENCES

Seidell: Solubilities of Organic Compounds, 3rd ed., vol. 2, p. 586 (1941).

Lange: Handbook of Chemistry, 8 ed., pp. 368, 532, 594 and 678 (1952).

Heilbron: Dictionary of Organic Compounds, vol. I, p. 16, and vol. IV, p. 520 (1953).